United States Patent [19]

Lammert et al.

[11] 4,112,698
[45] Sep. 12, 1978

[54] ARTICULATED STINGER

[75] Inventors: Wayne F. Lammert; Dayton M. Simpson; Ardeshir R. Desai, all of Houston, Tex.

[73] Assignee: Brown & Root, Inc., Houston, Tex.

[21] Appl. No.: 798,814

[22] Filed: May 20, 1977

[51] Int. Cl.² .......................... B63B 35/04; F16L 1/00
[52] U.S. Cl. .................................................. 405/167
[58] Field of Search ................. 61/108, 105, 107, 112, 61/106, 111

[56] References Cited

U.S. PATENT DOCUMENTS

| | | | |
|---|---|---|---|
| 3,589,136 | 6/1971 | Sorenson | 61/108 |
| 3,641,779 | 2/1972 | Koop et al. | 61/108 |
| 3,775,987 | 12/1973 | Rochelle et al. | 61/108 |
| 3,854,297 | 12/1974 | Broussard et al. | 61/108 |

Primary Examiner—Dennis L. Taylor
Attorney, Agent, or Firm—Kenway & Jenney

[57] ABSTRACT

An improved articulated stinger for laying pipe at the bottom of a body of water is disclosed. The first structural support for the pipe, after it leaves the vessel, is provided at a substantial distance from the vessel. A long, nonarticulated stinger link, attached to the vessel, does not engage the pipe and serves to position a buoyant stinger means beneath an effective wave action water depth. In addition, the long length of the stinger link separates the buoyant stinger means (and first pipeline support) from the vessel by a distance sufficient to substantially decouple vessel motion from the buoyant stinger means. There results through this arrangement significantly less banging between the pipe and the stinger assembly.

12 Claims, 4 Drawing Figures

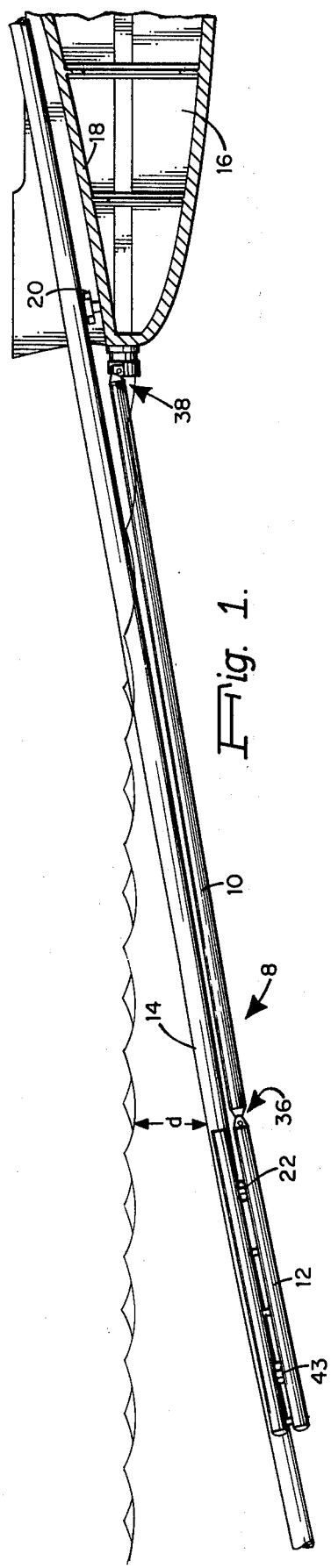
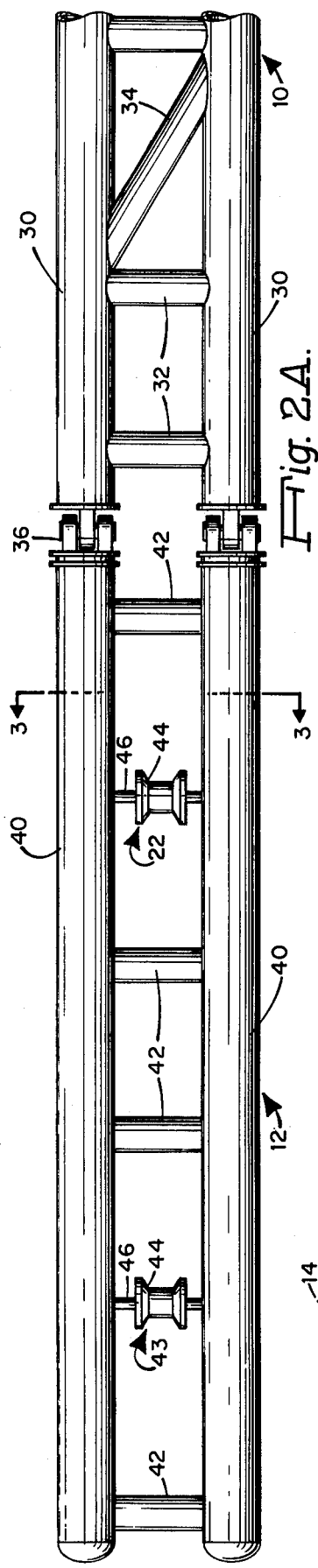
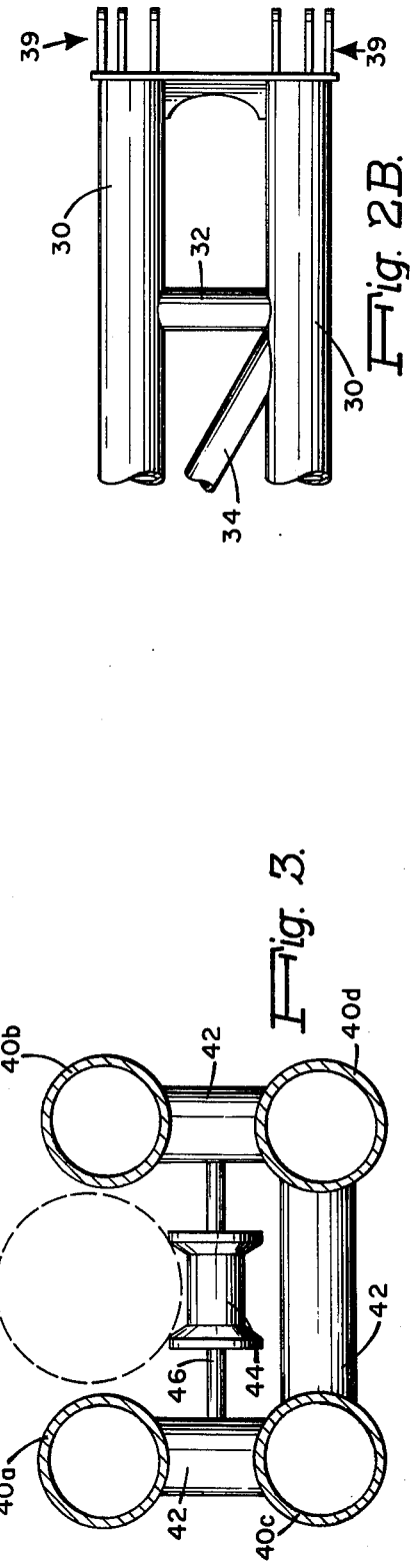

ARTICULATED STINGER

This invention relates to apparatus for laying pipe on the bottom of a body of water and more particularly to an improved articulated stinger apparatus for laying pipe.

BACKGROUND OF THE INVENTION

Several methods and apparatus have been developed for laying pipe underwater. When pipe is laid in deep water, it must be supported at intermediate positions along its length. One particular support apparatus and method, to which this invention pertains, involves a freely articulated stinger, i.e. a stinger free to pivot in at least the vertical plane, to lay pipe. Each such articulated stinger, according to prior apparatus and methods, provides structural support for pipe at intermediate points along the pipe path, and in the immediate vicinity of the pipelaying vessel.

A typical articulated stinger, such as that shown and described in Broussard et al. U.S. Pat. No. 3,438,213, comprises a plurality of pipe guiding elements, stinger elements, which are pivotably connected end to end so that they may pivot at least in a vertical plane. The articulated stinger is connected to a pipelaying vessel for pivotal movement in at least the vertical plane.

Aboard the vessel, sections of pipe are assembled and payed out onto the stinger assembly. The inclination and depth of the stinger assembly along its length is controlled by adjusting the buoyancy of the individual stinger elements, for example, by appropriate air and/or water content variations in the various elongated tubular components of the stinger. Wave action, however, at or near the surface of the water, tends to cause both the pipelaying barge and the articulated stinger attached thereto, at or near the water surface to move with the water fluctuations. As a result, out-of-phase movement between the vessel, the pipe and the stinger which supports the submerged pipe away from the vessel, can develop. When the relative movement between a portion of the stinger assembly and the corresponding portion of pipe are out of phase, banging between the pipe and the stinger can occur. In the extreme, severe banging may cause pipeline and/or stinger damage to occur.

It is therefore an object of this invention to provide an improved articulated stinger apparatus in which banging between the stinger apparatus and the pipe is substantially reduced, in which the first structural support for the pipe is at a depth below that at which effective wave action occurs, and wherein the pipe is unsupported for a significant distance beyond the last support on the pipelaying vessel.

Other objects of the invention include providing an articulated stinger assembly in which the first section is non-articulated and is substantially longer than each of the succeeding sections and in which the first support point for the pipe is near the connection point between a first extended, non-articulated stinger link and a buoyant stinger means and beneath the level of effective wave action.

SUMMARY OF THE INVENTION

The invention features a floating vessel having an articulated stinger apparatus connected thereto for laying pipe along the bottom of a body of water from the vessel. The stinger apparatus comprises a non-articulated stinger link and a stinger means having at least one relatively short, buoyant stinger element. The stinger link is connected at one end to the vessel for pivotal movement in at least the vertical plane. The stinger means is linearly connected to the other or free end of the non-articulated stinger link for pivotal movement in at least the vertical plane. The stinger means has pipeline support means for supporting and guiding the pipe along a pipe path leading to the bottom of the body of water. The non-articulated stinger link is disposed beneath, spaced from, and is free of contact with the pipe throughout an effective wave action water depth. The non-articulated link, in combination with the pipe and buoyant stinger means, is operable to position the stinger means and the pipeline support means beneath the effective wave action water depth.

In preferred embodiments of the invention, the stinger link is at least twice the length of said at least one stinger element and may be at least about 150 feet in length. In practice, this means that the buoyant stinger means and its associated pipeline support means are often submerged to a water depth beneath a submergence depth of the vessel. Consequently, the apparatus is characterized by a substantial absence of undulating movement while remaining articulated.

In another aspect, the invention features the method of laying pipe on the bottom of the body of water from a pipelaying vessel having an articulated stinger. The steps of the method include providing a non-articulated stinger link connected at a first end to the vessel for pivotal movement in at least a vertical plane; providing a stinger means having at least one relatively short buoyant stinger element, linearly connected to a second end of the non-articulated stinger link for pivotal movement in at least the vertical plane; providing the buoyant stinger means with pipeline support means for supporting and guiding the pipe along a pipe path leading to the bottom of the body of water; maintaining the stinger link beneath, spaced from, and free of contact with the pipe throughout an effective wave action water depth; and positioning, using the non-articulated stinger link, the buoyant stinger means and the pipeline support means beneath the effective wave action water depth.

DESCRIPTION OF THE DRAWINGS

Other features, advantages and objects of the invention will appear from the following description of a preferred embodiment of the invention taken in connection with the attached drawings thereof, in which:

FIG. 1 shows the stinger assembly according to the present invention, including the assembled pipe extending from the vessel (shown in fragmentary cross section) toward the bottom of the body of water;

FIG. 2A is a top view of a buoyant stinger element and a portion of a non-articulated stinger link;

FIG. 2B is a top view of the end of the non-articulated stinger link attached to the vessel; and FIG. 3 is a cross-sectional view of a buoyant stinger element along lines 3—3 of FIG. 2A.

DESCRIPTION OF A PREFERRED EMBODIMENT

Referring to FIG. 1, the articulated stinger apparatus 8, according to the invention, includes a plurality of stinger sections, such as a non-articulated stinger link 10 and a stinger means having one or more, buoyant stinger elements 12. In FIG. 1, only one buoyant stinger element 12 is shown, however a plurality of such buoyant stinger elements may be used if necessary. The elements would be connected linearly, in end-to-end contact, to form a chain-like assembly, in a manner heretofore known.

A flexible, elongated pipe 14 to be laid on the bottom of a body of water is assembled on board a pipelaying vessel 16, for example a barge. Unconnected sections of pipe are welded together on board the vessel and moved off of the vessel along an inclined ramp 18. The pipe is supported along the ramp by pipe shoes, and in particular is supported at point 20 as it leaves the vessel.

According to the invention and in marked contrast to earlier arrangements, the pipe is not supported again until a substantial distance "l" away from the vessel and at a substantial depth "d" beneath the surface of the body of water. Depth "d" is below effective wave action depth, i.e. the depth where wave action by itself would significantly influence undulating stinger movement. In the preferred embodiment, the pipe 14, after it leaves barge shoe 20, is not supported by the stinger apparatus until it reaches a support means 22 of stinger element 12.

Thus, support points 20 and 22 are operable to support pipeline 14 about link 10, spaced from this link, and free of contact therewith. Moreover, the length of link 10 is such as to position buoyant stinger element 12 below the anticipated, effective wave action depth, which may well position element 12 beneath the hull of vessel 16. Just as important, the stinger link positions the stinger means far enough away from the vessel, a horizontal distance "l", to effectively decouple movement of the stinger means from movement of the vessel transverse to the axis of the stinger link.

Referring to FIGS. 2A and 2B, stinger link 10 is constructed of two elongated, tubular elements 30 structurally connected by tubular cross elements 32 extending perpendicular to elements 30. Inclined tubular cross links 34 are provided for additional strength. Stinger link 10 is significantly longer than the stinger elements 12, preferably more than twice the length of the stinger elements 12, and usually exceeds the length of four or more 40 feed pipe joints. In the preferred embodiment, stinger link 10 is greater than 150 feet and preferably as much as 180 feet in length. Link 10 may or may not be buoyant in character, and may be neutrally buoyant.

Stinger link 10 is rovided at each end with a connecting means to provide hinged connections 36, 38 whereby the stinger link 10 can pivot in a vertical plane relative to the vessel 16 and the stinger elements. Other connections can be provided whereby stinger link 10 can pivot, to a limited extent, in the horizontal as well as the vertical plane. However in the disclosed embodiment, the stinger link pivots solely in the vertical plane. FIG. 2B shows in greater detail the configuration of the stinger link hitch 39 for connection to the vessel.

Stinger element 12 is provided at one end with connection means, of the type described in Rochelle et al. U.S. Pat. Re. No. 27,420 (1972), whereby stinger element 12 and stinger link 10 may be hingedly connected at 36 so that stinger element 12 can pivot in the vertical plane. A different connection means could be used at 36 so that stinger element 12 would have freedom of movement in more than one plane with respect to stinger link 10. In addition, jack-type means as disclosed in the aforesaid Rochelle et al. patent might be employed at connection 36 in order to control stinger profile.

Stinger element 12 is preferably less than 75 feet in length and in the preferred embodiment is on the order of 60 feet long.

In the preferred embodiment, stinger element 12 is comprised of four elongated tubular sections 40 which are rigidly connected by interconnecting structural supports 42. Sections 40, in cross section, are positioned at the four corners of a rectangle (FIG. 3) so as to define a pipeline receiving cradle. Stinger element 12 is also provided with two or more pipe support means or shoes 22 and 43 for slideably supporting the pipe as it passes from the vessel to the bottom of the body of water. Supports 22 and 43 may comprise spools or rollers 44 mounted for rotation on axles 46. Thus, the pipe is supported on spools 44 between upper tubular sections 40a and 40b (FIG. 3) as it is payed out from the vessel.

In the illustrated embodiment, the stinger means includes one buoyant stinger element 12. However, additional stinger elements 12 could be used, depending upon the depth at which the pipe was being laid. If additional elements are used, each stinger element 12 would have connection means at both ends to connect to the next stinger element of the sequence. As a result, the number of submerged support means provided for pipe 14 would increase.

The varieties of pipe which can be used in connection with this invention is restricted because of the unusually long distance between the pipe support on the vessel and the first stinger support. Thus the pipe must have sufficient strength so that it does not rest on or contact the stinger link 10 along its length and can safely remain unsupported throughout the length of link 10.

As noted above, in the preferred embodiment, stinger link 10 does not provide any support for pipe 14. In other embodiments, however, it may be desirable to provide means to support the pipe substantially at or near connection point 36. The support could be provided by stinger link 10 or by element 12, but in any event would be below effective wave action depth.

In practicing the invention, pipelaying operations would proceed in the general manner described in Rochelle et al. U.S. Pat. Re. No. 27,420 (1972). Through the use of suitable manual or remote control means, the buoyancy of the stinger means would be adjusted in order to attain the desired profile for the stinger and submerged pipeline portion.

Because of the long, non-articulated nature of stinger link 10 which effectively decouples the movement of the vessel from movement of the stinger means and because the first submerged stinger articulating joint 36 and the first submerged pipeline support 22 are beneath the effective wave action influence zone, pipelaying will proceed with a substantial absence of undulating stinger movement, even though the stinger means remains articulated.

As a result, "banging" between the pipeline and stinger in the vicinity of pivot 38, as heretofore sometimes encountered, will be substantially eliminated or controlled.

MAJOR ADVANTAGES OF THE INVENTION AND UNOBVIOUSNESS

The articulated stinger apparatus, according to the present invention, advantageously provides significantly less "banging" between the stinger assembly and the pipe and therefore reduces the pipeline and stinger damage.

The articulated stinger according to the invention utilizes an elongated non-articulated link structure of sufficient length to provide a first pipe support at a substantial distance after the pipe leaves the vessel, and located beneath effective wave action depth. The first support provided by the stinger, will thus be at a point below the depth of effective wave action and will therefore be relatively unaffected by wave action at the surface. In addition, the distance between the stinger means and the vessel substantially decouples movement of the stinger means from movement of the vessel.

Other advantages of the invention reside in smoother towing and handling characteristics attributed to the present stinger and in the elimination of structural complications found in "gooseneck"-type stingers.

Articulated stingers are well known in the art. They are described, for example, in Hauber et al. U.S. Pat. No. 3,280,571 (1966), Broussard et al. U.S. Pat. No. 3,472,035 (1969), Rochelle et al. U.S. Pat. Re. No. 27,420 (1972), Lloyd U.S. Pat. No. 3,704,596 (1972), and many others. Pipe ramp extensions or links are also featured in Collins U.S. Pat. No. 2,735,270 (1956); Koop, Jr. et al. U.S. Pat. No. 3,641,779 (1972) and Broussard et al. U.S. Pat. No. 3,854,297 (1974). However none of these prior art teachings contemplates or suggests the novel stinger structure of the present invention, with its unique resistance to wave action induced out-of-phase "banging" problems. Indeed, such prior art makes no reference to the "banging" problem which is believed to be substantially solved and controlled through the present invention.

Those skilled in the pipelaying art and familiar with this disclosure may recognize additions, deletions, substitutions, equivalents, modifications and/or configurations within the scope of the invention, as set forth in the appended claims.

What is claimed is:

1. An articulated stinger apparatus connected to a floating vessel for laying the pipe along the bottom of a body of water from said vessel, said stinger apparatus comprising
    a relatively long, non-articulated stinger link, said stinger link being connected at a first end to said vessel for pivotal movement in at least a vertical plane;
    a buoyant stinger means having at least one relatively short, buoyant stinger element, said one buoyant element being linearly connected to a second end of said non-articulated stinger link for pivotal movement at least in the vertical plane;
    each said buoyant stinger element having pipeline support means for supporting and guiding said pipe along a pipe path leading to the bottom of the body of water;
    a last pipeline support element on said vessel and a first contacted pipeline support of said stinger apparatus cooperating to support said pipe in a position disposed above, spaced from, and free of contact with said non-articulated stinger link throughout an effective wave action water depth;
    said pipe receiving no contacting support between said last pipeline support element on said vessel to said first stinger apparatus support;
    said last pipeline support element on said vessel and said first contacted pipeline support of said stinger apparatus cooperating for reducing banging of said pipe and said stinger link throughout said wave action depth; and
    said non-articulated link in combination with said pipe and said buoyant stinger means being operable to position said buoyant stinger element and said pipeline support means beneath said effective wave action water depth.

2. The stinger apparatus of claim 1 wherein
    said non-articulated stinger link is at least twice the length of said at least one buoyant stinger element;
    said apparatus further comprises means for positioning said buoyant stinger means at a water depth below the submergence depth of said vessel;
    said pipeline support means is positioned at a water depth below the submergence depth of said vessel; and
    said apparatus is characterized by a substantial absence of undulating movement while remaining articulated.

3. The stinger apparatus of claim 1 wherein said non-articulated stinger link is at least about 150 feet in length.

4. The stinger apparatus of claim 1 wherein
    said stinger link includes at most two longitudinal tubular elements connected in a plane by cross-link supporting elements, and
    said stinger elements each include four elongated tubular sections rigidly connected on three sides by a plurality of interconnecting structural supports, said sections being positioned in cross section, at the four corners of a rectangle,
    whereby said sections provide a U-shaped cradle support for said pipeline.

5. The stinger apparatus of claim 1 wherein
    said stinger link has a longitudinal length sufficient for spacing said stinger means apart from said vessel a distance whereby movement of said vessel in a direction transverse to a longitudinal axis of said stinger link is substantially decoupled from the stinger means.

6. A method for laying pipe along the bottom of a body of water from a pipelaying vessel having an articulated stinger comprising the steps of
    paying out pipe from said vessel;
    providing a relatively long non-articulated stinger link connected at a first end to the vessel for free pivotal movement in at least a vertical plane;
    providing a buoyant stinger means having at least one relatively short buoyant stinger element, said one buoyant element being linearly connected to a second end of the non-articulated stinger link for pivotal movement in at least the vertical plane;
    providing each said buoyant stinger element with pipeline support means for supporting and guiding the pipe along a pipe path leading to the bottom of the body of water;
    supporting said pipe in a position above, spaced from, and free of contact with the stinger link throughout an effective wave action water depth for reducing banging of said pipe and said stinger link throughout said effective wave action depth,
    said pipe receiving no support from said stinger link between a last pipeline support element on said vessel and a first pipeling support element of said articulated stinger; and
    positioning, using the non-articulated stinger link, the buoyant stinger means and the pipeline support means beneath the effective wave action water depth;

whereby said pipe is guided by said stinger means to the bottom of said body of water.

7. The method of claim 6 including the steps of
positioning the buoyant stinger means at a water depth below a submergence depth of said vessel;
positioning the pipeline support means at a water depth beneath the submergence depth of the vessel; and
making the non-articulated stinger link at least twice the length of said at least one buoyant stinger link;
whereby there is provided a substantial absence of undulating movement while the elements remain articulated.

8. The method of claim 6 including the step of providing a second pipeline support means connected to said stinger link beneath the effective wave action depth.

9. The method of claim 6 including the step of maintaining said stinger means at a horizontal distance from said vessel sufficient to effectively decouple movement at said vessel in a direction transverse to a longitudinal axis of said stinger link, from movement of said stinger means.

10. An articulated stinger apparatus operable in combination with a floating vessel for laying pipe along the bottom of a body of water from said vessel, the stinger assembly including a stinger means having at least one relatively short buoyant stinger element, said buoyant stinger means including pipe support means for supporting and guiding said pipe along a pipe path leading to the bottom of a body of water, the improvement comprising
a relatively long non-articulated stinger link, said non-articulated stinger link being connected at a first end to said vessel for pivotal movement in at least a vertical plane and at a second end to said one buoyant stinger element for pivotal movement in at least the vertical plane;
said non-articulated stinger link being operable in combination with said one stinger element and said pipe to position said one buoyant stinger element and said pipe support means beneath an effective wave action water depth;
a last pipeline support element on said vessel and a first contacted stinger apparatus support element for maintaining said pipe in a position, when used for laying pipe, disposed above, spaced from, and free of contact with said stinger link throughout the effective wave action water depth;
said pipe receiving no contacting support between said last pipeline support element on said vessel and said first contacted stinger apparatus support element; and
said last pipeline support element on said vessel and said first contacted stinger apparatus cooperating for reducing banging between said pipe and said stinger apparatus throughout said effective wave action depth.

11. The articulated stinger assembly of claim 10 wherein
the non-articulated stinger link is at least twice the length of said at least one buoyant stinger element;
wherein said apparatus further comprises means for positioning each said buoyant stinger element at a water depth below a submergence depth of said associated vessel; and
said first contacted pipeline support element of said assembly is positioned at a water depth below the submergence depth of said vessel;
whereby said apparatus is characterized by a substantial absence of undulating movement while remaining articulated.

12. The stinger apparatus of claim 10 wherein said non-articulated stinger link is at least about 150 feet in length.

* * * * *